Aug. 18, 1953  F. D. SAWYER  2,648,997
ADJUSTABLE LINK
Filed April 12, 1950
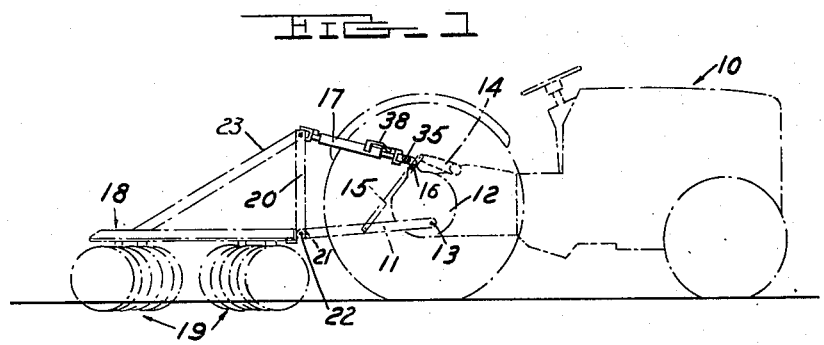
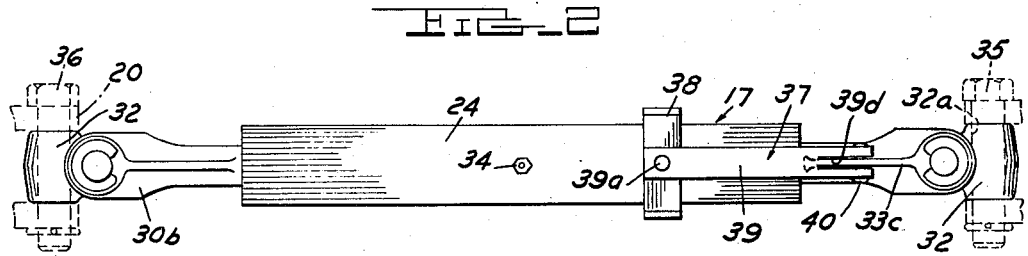
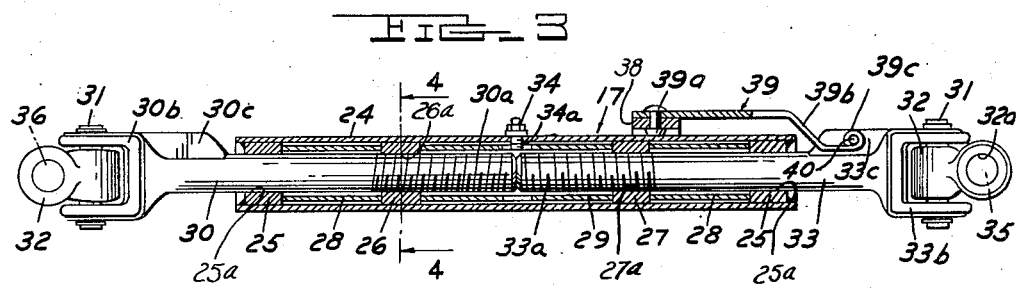
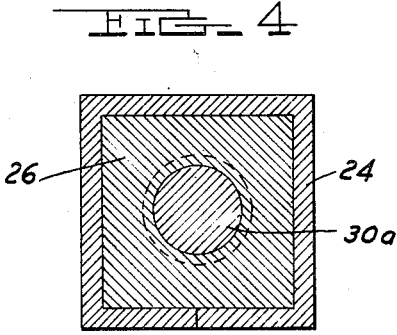
INVENTOR.
FREDERICK D. SAWYER
BY
*H. W. Schaich*
ATTORNEY Patented Aug. 18, 1953

2,648,997

UNITED STATES PATENT OFFICE 2,648,997

ADJUSTABLE LINK

Frederick D. Sawyer, Wayne, Mich., assignor to Dearborn Motors Corporation, Highland Park, Mich., a corporation of Delaware Application April 12, 1950, Serial No. 155,499

4 Claims. (Cl. 74—586)

This invention relates to an improved adjustable top link for the well known three point implement mounting linkage of a tractor for adjusting the position of implements attached to such linkage.

Many tractors today utilize a three point implement hitch linkage comprising a pair of vertically swingable, transversely spaced power-lifted draft links and a rigid top link for mounting an implement on such links. This arrangement conveniently permits the implement to be raised from or lowered to the ground. This relatively fixed linkage arrangement works satisfactorily with most implements mounted thereon as the need for adjusting the position or leveling such implement when once mounted is not present. However, some implements such as lift type harrows require further leveling after mounting on the linkage system to provide optimum operation.

The top or upper link must be of rigid construction to satisfactorily function, hence providing any longitudinal adjustment of such top link presents a problem.

Accordingly, it is an object of this invention to provide an improved adjustable top link for a tractor having a three point implement hitch linkage for leveling of an implement mounted on such linkage system to the optimum working position.

A further object of this invention is to provide an adjustable top link construction which is economical to manufacture, convenient to adjust, and rugged to give long service life.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view showing a lift type disc harrow mounted on the vertically swingable trailing draft links of a tractor and incorporating the improved adjustable top link of this invention.

Figure 2 is an enlarged plan view of the improved adjustable top link.

Figure 3 is a longitudinal sectional view of the assembled adjustable top link shown in Figure 2.

Figure 4 is an enlarged cross sectional view taken along the plane 4—4 of Figure 3.

As shown on the drawings:

Briefly, the improved adjustable top link of this invention comprises a tubular member having longitudinally adjustable screw members projecting out of each end of the tubular member, such screw members being respectively threadably engageable with a pair of nut members contained in the tube. Each screw member and the corresponding nut are oppositely threaded so that such screws may be moved inwardly or outwardly merely by rotating the tube portion. A yoke is provided on each of the screw members for respectively attaching to the hitch points on the tractor and implement. A locking member is provided to lock the tubular member against rotation when such member is in a desired position of adjustment.

Referring to Figure 1, there is shown a well known type of tractor 10 provided with a pair of transversely spaced, vertically swingable draft links 11 pivotally secured to the axle housing 12 of tractor 10 as at 13. A pair of transversely spaced lift arms 14 are provided on tractor 10 which are rotatable by a hydraulically operated ram (not shown) built into the tractor. Lift arms 14 are respectively connected to draft links 11 by connecting rods 15. A lug 16 is provided on top of axle housing 12 to which the improved adjustable top link 17 of this invention is pivotally connected as will be later described.

It should be understood that the use of such top link is not limited solely to disc harrows, but may also be employed with a cultivator or any other implement requiring a leveling adjustment as will be explained. Accordingly, a lift type disc harrow as shown in Figure 1 is selected only to illustrate the use of this invention. Such harrow comprises esssentially a main frame 18 having a plurality of disc gangs 19 secured in depending relationship from such frame. A well-known type of A-frame 20 is connected to a pair of forwardly projecting lugs 21 provided on the front of main frame 18 by transverse mounting pins 22, which are also utilized for mounting the trailing draft links 11 of the tractor thereon. A-frame 20 is supported in a vertical position by a pair of downwardly and rearwardly sloping brace members 23 respectively secured at their ends by suitable bolts (not shown) to the A-frame 20 and main frame 18.

The improved adjustable top link 17 of this invention comprises a main tubular body portion 24 preferably of square cross section. A bushing member 25 having an axial aperture 25a is secured in each end of the tubular body portion 24 as by welding. A pair of square nuts 26 and 27 are inserted within tubular body portion 24 and such nuts are maintained in axially spaced relationship by two tubular end spacers 28 and a center spacer 29, spacer 28 separating nuts 26 and 27 from the adjacent bushing 25 while center spacer 29 maintains the two nuts 26 and 27 apart. The pair of nuts 26 and 27 are respectively provided with bores 26a and 27a and each of the threaded bores 26a and 27a are oppositely threaded, that is, one with a right hand thread and the other with a left hand thread for a purpose to be later explained.

A rod 30 having one end 30a threaded is insertable in the left hand end of tube 24 through bushing 25 and into threadable engagement with nut 26 and a yoke 30b is provided on the outer end of rod 30. Aligned transverse holes (not shown) are provided respectively in the arms of yoke 30b to transversely support a pin member 31 within yoke 30b. Pin 31 is provided to rotatably mount a knuckle member 32 within such yoke. A second rod member 33 having a threaded end 33a and a yoke 33b integrally provided on the opposite end of such rod is insertable through right hand bushing 25 for engagement with nut 27. Rod 33 with yoke 33b is identical to rod 30 and yoke 30b with the exception of the direction of the threads on the threaded end 33a which engages the threaded nut 27. An additional pin 31 is similarly supported by yoke 33b to rotatably support another knuckle 32 on such pin within yoke 33b.

Rods 30 and 33 are lubricated through a conventional grease fitting 34 threadably secured within a transverse threaded hole 34a on the top of tube 24 as shown in Figures 2 and 3, and such fitting projects through transverse hole 29a and provided in spacer 29.

The tubular body portion 24 may be locked against rotation by a lock member 37 which comprises a U-shaped clip 38 which partially surrounds the tubular body portion 24, as best shown in Figures 1 and 2. Clip 38 is secured by a rivet 39a in depending relation to one end of a longitudinally extending arm 39. The other end of arm 39 is offset as shown at 39b to clear the end of tubular body portion 24 as shown in Figure 3 and the offset end 39b of such arm terminates in a circular loop 39c. Such looped end is bifurcated as shown at 39d (Figure 2) to surround an integral longitudinal lug 33c provided on top of yoke 33b as shown in Figures 2 and 3. Bifurcated looped end 39c is pivotally secured to lug 33c by a transverse pin 40 insertable through a suitable transverse hole in lug 37 and cooperable with looped end 39c of arm 39. Clip 38 is secured to the walls of tube 24 by spring pressure so that lock 37 may be readily pivoted about pin 40 out of locking engagement with tube 24 to permit rotation of body portion 24 for longitudinal adjustment of adjustable link 17.

The adjustable link 17 is pivotally mounted on tractor lug 16 by a transverse linch pin 35, insertable through an aperture 32a provided in knuckle 32, while the other end of adjustable link 17 is similarly pivotally connected to the top of A-frame 20 by a pin 36 (Figure 2). Frame 18 of the disc harrow when lowered to the ground engaging position shown in Figure 1 is then readily leveled by rotating the tubular body 24 of adjustable link 17 which moves rods 30 and 33 in or out of tubular body portion 24 in response to rotation of such body member to change the effective length of link 17 and thus raise or lower the rear end of harrow main frame 18. The square configuration of tubular body 24 permits its ready rotation by hand, or by a wrench if needed.

From the foregoing description it will thus appear that there is here provided an improved adjustable top link which permits limited longitudinal adjustment of such link for leveling of any implement mounted on the vertically movable draft links 11 of the tractor. The adjustable elements of the link are totally enclosed and may be readily and conveniently packed with a lubricant for lubrication and for exclusion of all dirt and moisture to provide trouble-free and long life of the link. Adjustment may be conveniently made by the operator from the tractor seat. The body portion of the adjustable link is readily and conveniently locked in a non-rotatable position by a simple yet positive locking device.

It will, of course, be understood that various details of construction may be varied through a wide range without departing from the principles of this invention and it is, therefore, not the purpose to limit the patent granted hereon otherwise than necessitated by the scope of the appended claims.

I claim:

1. An adjustable link comprising a tubular body having an elongated interior recess of polygonal cross-section adapted to contain a lubricant, a pair of polygonal nut members fixed in said tubular body in axially spaced relation and retained against rotation within said body by the polygonal exterior surfaces of said nuts snugly nesting against the polygonal surfaces of said recess and said nut members being oppositely threaded, a pair of threaded rod members respectively cooperable with said threaded nuts, one end of each of said rod members projecting out of an end of said tubular body, whereby rotation of said tubular body changes the length of said link, and a pair of bushings respectively mounted in the ends of said tubular body and cooperating with said rod members to retain lubricant within said tubular body.

2. An adjustable link for connecting an implement to a tractor, comprising a square tubular body, a tubular inner spacer inserted in the center of said square tubular body, a pair of square nut members inserted in said square tubular body respectively adjacent opposite ends of said spacer, a pair of tubular outer spacers inserted in said square tubular body respectively adjacent the outer faces of said square nut member, a pair of bushings respectively inserted in the opposite ends of said square tubular body and abutting the outer ends of said outer tubular spacers, means for securing said bushings against longitudinal displacement relative to said square tubular body, said bushings having cylindrical bores, a pair of threaded rod members respectiveily insertable through said bushings and cooperable with said square nut members, means on the ends of said rod members for pivotally securing such ends respectively to the tractor and the implement, whereby rotation of said square tubular body changes the effective length of said link, and a latch pivotally mounted on the projecting ends of one of said rod members and detachably resiliently engageable with said square tubular body for preventing rotation of said square tubular body.

3. An adjustable link for connecting a tractor to an implement comprising a tubular body having an interior open-ended recess provided with angularly disposed wall surfaces defining the inner periphery thereof, rod members telescopically projecting into each open end of said body, means at the exposed ends of each of said rods for pivotally connecting said link between the tractor and the implement, the other end of at least one of said rods having peripheral threads thereon, and an interiorly threaded axially fixed element of polygonal outer contour matingly engaging the inner peripheral wall surfaces of said recess to retain said element against rotation relative to said body, the threads of said one of said rods and said fixed element being engageable to accommodate telescopic movement of said rod and said body upon relative rotative movement thereof.

4. An adjustable link comprising a tubular body having axial bore of square cross sectional configuration, a pair of square nut members inserted in said body and retained against rotation in said bore by the mating contact of said square nuts with the interior surfaces of said square bore, said square nut members being oppositely threaded, means for axially spacing said square nut members within said bore, a pair of threaded rod members respectively cooperable with said threaded square nut members, one end of each of said rod members projecting out of an end of said square tubular body, whereby rotation of said square tubular body changes the length of said link, and a pair of bushings respectively mounted in the end of said tubular body and cooperating with said rod members to define an enclosed lubricant containing space within said square tubular body.

FREDERICK D. SAWYER.

References Cited in the file of this patent

UNITED STATES PATENTS

| Number | Name | Date |
| --- | --- | --- |
| 125,999 | White | Apr. 23, 1872 |
| 310,767 | Wilson | Jan. 13, 1885 |
| 579,334 | Williams | Mar. 23, 1897 |
| 797,635 | Telejszo | Aug. 22, 1905 |
| 1,012,008 | Post | Dec. 19, 1911 |
| 1,061,060 | Ford | May 6, 1913 |
| 1,411,279 | Jaynes | Apr. 4, 1922 |
| 2,462,588 | Wondra | Feb. 22, 1949 |
| 2,512,501 | Miller | June 20, 1950 |

FOREIGN PATENTS

| Number | Country | Date |
| --- | --- | --- |
| 200,236 | Canada | May 25, 1920 |